(12) United States Patent
Serpe et al.

(10) Patent No.: US 7,064,930 B2
(45) Date of Patent: Jun. 20, 2006

(54) SLIDER DEPOSITS FOR CONTROL OF POLE-TO-DISC SPACING

(75) Inventors: Catalin I. Serpe, Roseville, MN (US); Ladislav R. Pust, Savage, MN (US); Moshe Olim, Eden Prairie, MN (US); Mary C. Hipwell, Minneapolis, MN (US); John R. Pendray, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/140,801

(22) Filed: May 7, 2002

(65) Prior Publication Data

US 2002/0176208 A1 Nov. 28, 2002

Related U.S. Application Data

(60) Provisional application No. 60/293,276, filed on May 23, 2001.

(51) Int. Cl.
  *G11B 5/60* (2006.01)
  *G11B 5/596* (2006.01)
  *G11B 21/21* (2006.01)
(52) U.S. Cl. .............................. 360/236.5; 360/235.1; 360/235.7; 360/294.7
(58) Field of Classification Search ............. 360/235.7, 360/236.5, 235.1, 235.3, 294.7
See application file for complete search history.

(56) References Cited

U.S. PATENT DOCUMENTS

| | | | |
|---|---|---|---|
| 5,710,683 A | 1/1998 | Sundaram | |
| 5,872,684 A * | 2/1999 | Hadfield et al. | 360/235.4 |
| 5,896,243 A | 4/1999 | Koshikawa et al. | |
| 5,898,542 A | 4/1999 | Koshikawa et al. | |
| 5,909,340 A | 6/1999 | Larison et al. | |
| 5,949,627 A | 9/1999 | Williams et al. | |
| 5,959,801 A * | 9/1999 | Gillis et al. | 360/235.4 |
| 5,991,113 A | 11/1999 | Meyer et al. | |
| 6,069,770 A * | 5/2000 | Cui et al. | 360/236.6 |
| 6,219,200 B1 | 4/2001 | Waki et al. | 360/126 |
| 6,414,818 B1 * | 7/2002 | Tanimoto et al. | 360/126 |
| 6,428,715 B1 * | 8/2002 | Abels et al. | 216/22 |
| 6,679,762 B1 * | 1/2004 | Fatula et al. | 29/603.08 |
| 2002/0141113 A1 * | 10/2002 | Kang et al. | 360/236.5 |
| 2002/0145829 A1 * | 10/2002 | Gates et al. | 360/235.7 |

* cited by examiner

*Primary Examiner*—Craig A. Renner
(74) *Attorney, Agent, or Firm*—Westman, Champlin & Kelly (57) ABSTRACT

A head for a disc drive and a method of making the head. The head includes a substrate with a trailing side and a first air bearing surface that generates lift. A magnetic transducer is deposited along the trailing side and has a pole tip that is spaced apart from a disc by a pole-to-disc spacing. The head also includes a deposit along the trailing side. The deposit includes a second air bearing surface that changes position relative to the first air bearing surface as temperature increases.

30 Claims, 11 Drawing Sheets

SLIDER DEPOSITS FOR CONTROL OF POLE-TO-DISC SPACING

CROSS-REFERENCE TO RELATED APPLICATION

This application claims priority benefits from U.S. Provisional Application No. 60/293,276 titled "Slider Features for Temperature Fly Height Control," filed May 23, 2001.

FIELD OF THE INVENTION

This invention relates to disc drives. In particular, this invention relates to temperature compensation of pole-to-disc spacing (fly height) of heads in disc drives.

BACKGROUND OF THE INVENTION

When a disc drive is energized, it warms up and has a temperature rise. In particular, there are large temperature rises in the heads used in a disc drive. The heads include magnetic transducers deposited on slider substrates. The magnetic transducers carry electrical currents that generate heat in the heads. The temperature rise in the heads is large because the heads have a small surface area in relation to the amount of heat that is dissipated in the magnetic transducers.

The magnetic transducers typically have a higher coefficient of thermal expansion (CTE) than the slider substrates. As temperature increases, the magnetic transducers thermally expand at a greater rate than the slider substrates. The thermal expansion causes the pole/shield tips of the magnetic transducers to protrude with respect to an air bearing surface of the slider substrate. At higher temperatures, the pole/shield tips are closer to the media and the pole-to-disc spacing (also called transducer-media spacing or fly height) is reduced. If the pole-to-disc spacing at lower temperature is not large enough, the protruded pole/shield tips hit the media at higher temperature.

To avoid transducer-media contact at higher temperatures, the pole-to-disc spacing at lower temperatures is kept relatively large. This large pole-to-disc spacing at lower temperatures, however, undesirably limits the electrical performance of transducers, particularly the areal bit density (gigabits per square inch) that can be achieved.

A method and apparatus are needed that correct the problems associated with pole tip protrusion at higher temperatures.

SUMMARY OF THE INVENTION

Disclosed are a head for a disc drive and a method of making the head. The head comprises a substrate. The substrate includes a trailing side and a substrate air bearing surface that is shaped to fly over a disc and that generates a first lift. The head also comprises a magnetic transducer that is deposited along the trailing side. The magnetic transducer has a pole tip that is spaced apart from a disc by a pole-to-disc spacing. The head also comprises a first deposit deposited along the trailing side. The first deposit includes a first compensating air bearing surface that changes position relative to the substrate air bearing surface as temperature increases.

Additional features and benefits will become apparent with a careful review of the following detailed description and the corresponding drawings.

DETAILED DESCRIPTION

In the heads disclosed here, pad-like surfaces at a trailing edge of a head substrate are made of a material with a different coefficient of thermal expansion than the substrate and/or magnetic transducer layers. The pad-like surfaces generate an additional compensating air bearing force on the heads. This additional force increases lift (upward force) of an already high pressure region or decreases suction (downward force) of an already low pressure region. This can beneficially compensate or correct pole-to-disc spacing when changes in temperature occurs. With the use of the pads, the pole-to-disc spacing is temperature compensated and a narrower pole-to-disc spacing at room temperature can be selected for use. A higher density of data storage can be achieved without danger of head crashes at higher temperatures.

Thermal compatibility between substrate and overcoat layers on the trailing side of the slider limits the choice of materials for the slider. The use of materials with very different coefficients of thermal expansion can lead to thermal distortions in some slider areas that may adversely affect the pole-to-disc spacing. In particular, the high (local) temperature near the magnetic transducer causes thermal deformations that lead to protrusion of the pole tip and contact with the disc surface. Good control of the pole-to-disc spacing is required for good mechanical and electrical performance.

In embodiments described below, features at the trailing edge of the slider expand due to temperature changes and thus create additional air-bearing pressure at higher temperatures and compensate for the pole-to-disc spacing loss. At least some of the material used to manufacture the features have a coefficient of thermal expansion (CTE) that is preferably higher than that of substrate and/or overcoat. The pad-like features can be placed in a cavity in the substrate or on the overcoat area (trailing side), or both, preferably close to the magnetic transducer, but not necessarily limited to that region. Preferably, the initial pad height level is lower than the air-bearing surface (ABS). The size, shape and geometry and materials of the features are selected in such a way that, as temperature changes, either due to ambient temperature change or due to heating of the magnetic transducer, the thermal distortion of the feature changes the altitude of the pad level relative to the adjacent air bearing surface level on the substrate. This in turn will create additional air-bearing pressure and will increase total lift for the head and temperature compensate the pole-to-disc spacing between the pole tip and the disc surface.

Figure 1:
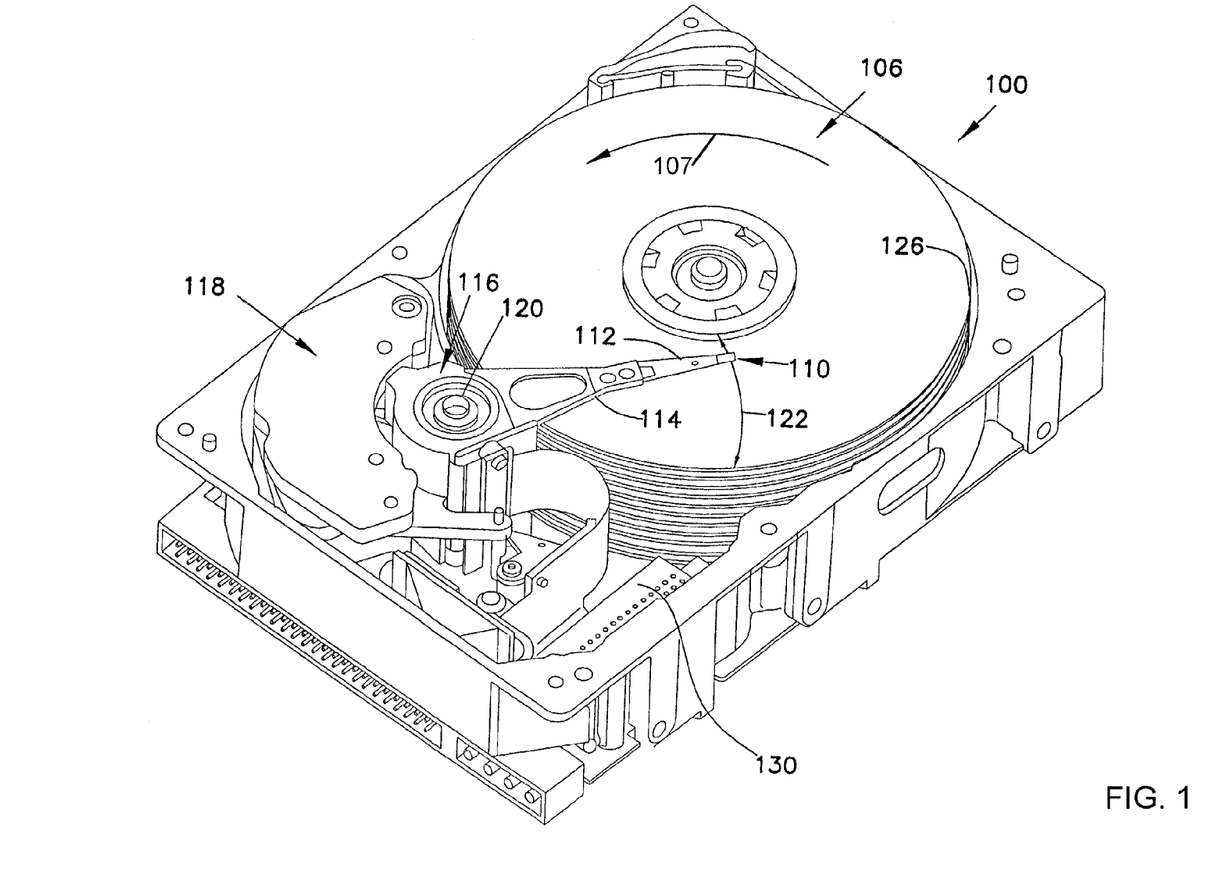
FIG. 1 illustrates an embodiment of a disc drive including a head with a first deposit that includes a temperature compensating air bearing surface.

FIG. 1 illustrates an embodiment of a disc drive 100 including a head 110 with a deposit that temperature compensates pole-to-disc spacing. Disc drive 100 includes a disc pack 126 having storage surfaces 106 that are typically layers of magnetic material. The disc pack 126 includes a stack of multiple discs. A read/write head assembly 112 includes the head 110 with a magnetic transducer for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. A circuit at location 130 controls the position of head 110 and electrically interfaces the read/write head 110 with a computing environment.

Figure 2:
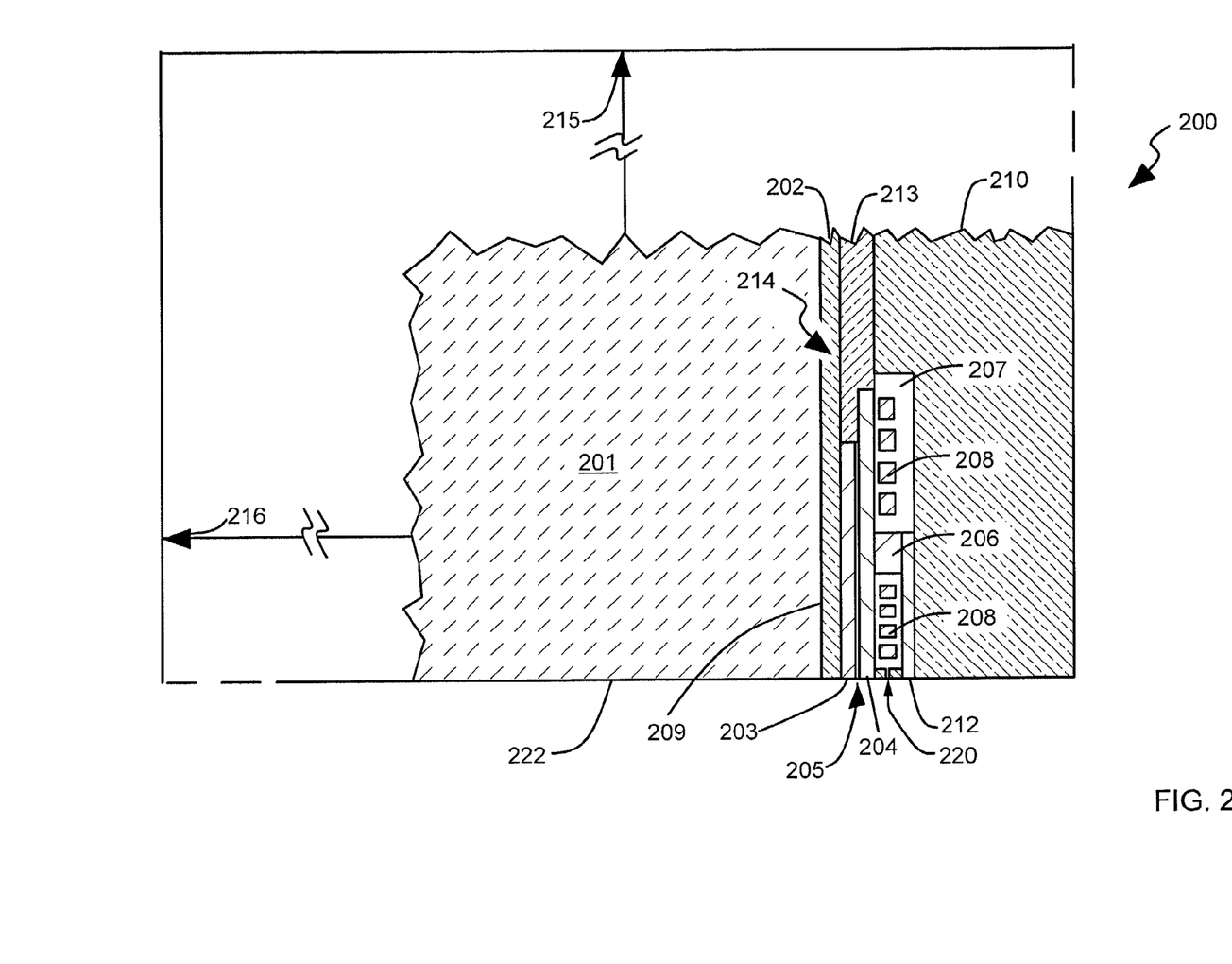
FIG. 2 schematically illustrates a cross-section of a head before lapping.

FIG. 2 schematically illustrates a partial cross-section of a head 200 for a disc drive before lapping. Head 200 includes a thin film read/write transducer 214 with gaps and other internal dimensions adapted for areal densities of 20 gigabits/square inch or more. The transducer 214 is deposited on a substrate 201. A large part of the head 200 is built from a substrate 201 that extends to edges 215 and 216 as illustrated. The portion of head 200 that is illustrated in cross-section in FIG. 2 is near the trailing side 209 of substrate 201 along a central plane perpendicular to an air bearing surface 222 of the head 200.

The substrate 201 is preferably formed from an electrically conducting ceramic material, such as a mixture of aluminum oxide ($Al_2O_3$) and titanium carbide (TiC), referred to in this application as "AlTiC".

A basecoat material 202 is deposited on the trailing side 209 of substrate 201. The basecoat material 202 is an electrically insulating material, typically $Al_2O_3$, with a CTE close to that of substrate 201. The basecoat material 202 forms a bond to the substrate material 201.

Deposited metallic magnetic layers from alloys of iron (Fe), nickel (Ni), or cobalt (Co) form a lower shield 203, shared pole 204, top pole 212 and a core 206. Core 206 completes a write magnetic circuit through the center of a coil 208 and through a pole tip 220 at the air bearing surface 222. The metallic magnetic layers 203, 204, 212, 206 typically have a large coefficient of thermal expansion (CTE), e.g. magnetic alloy $Ni_{79}Fe_{21}$ with a CTE of about $12.2 \times 10^{-6}/°$ C.

The write coil 208 in the transducer 214 is preferably made from copper with CTE=$16.5 \times 10^{-6}/°$ C. or from another highly electrically conducting metal or alloy.

A coil insulator 207 is typically formed from a cured photoresist with large CTE, similar to or even larger than the CTE of the metallic magnetic layers 203,204,212,206 and the CTE of the write coil 208.

An additional deposited insulating layer 213 fills the space around lower shield 203, and shared pole 204. Layer 213 is typically made from $Al_2O_3$ and forms a bond to basecoat layer 202.

A read sensor 205 is formed in a very thin layer between lower shield 203 and shared pole 204. Read sensor 205 is typically a magnetoresistive (MR) or giant magnetoresistive (GMR) sensor.

For clarity, electrical leads and contacts, formed from Cu, Au, or other metals or metallic alloys in a conventional manner are not illustrated in FIG. 2.

An insulating overcoat or topcoat layer 210 is deposited on the top of all the transducer 214. Overcoat layer 210 is typically also made from $Al_2O_3$ with a CTE close to that of the substrate 201. Overcoat layer 210 is planarized after deposition to expose electrical contacts (not illustrated) for the coil 207 and read sensor 205 in the transducer 214.

After the head 200 is formed as illustrated in FIG. 2, it is lapped to shape the air bearing surface (ABS) 222 that flies over the magnetic media. This lapping is explained in more detail below in connection with FIG. 3.

Throughout this application, reference numerals used in one Figure that are the same as reference numerals used in another Figure designate the same or comparable features.

Figure 3:
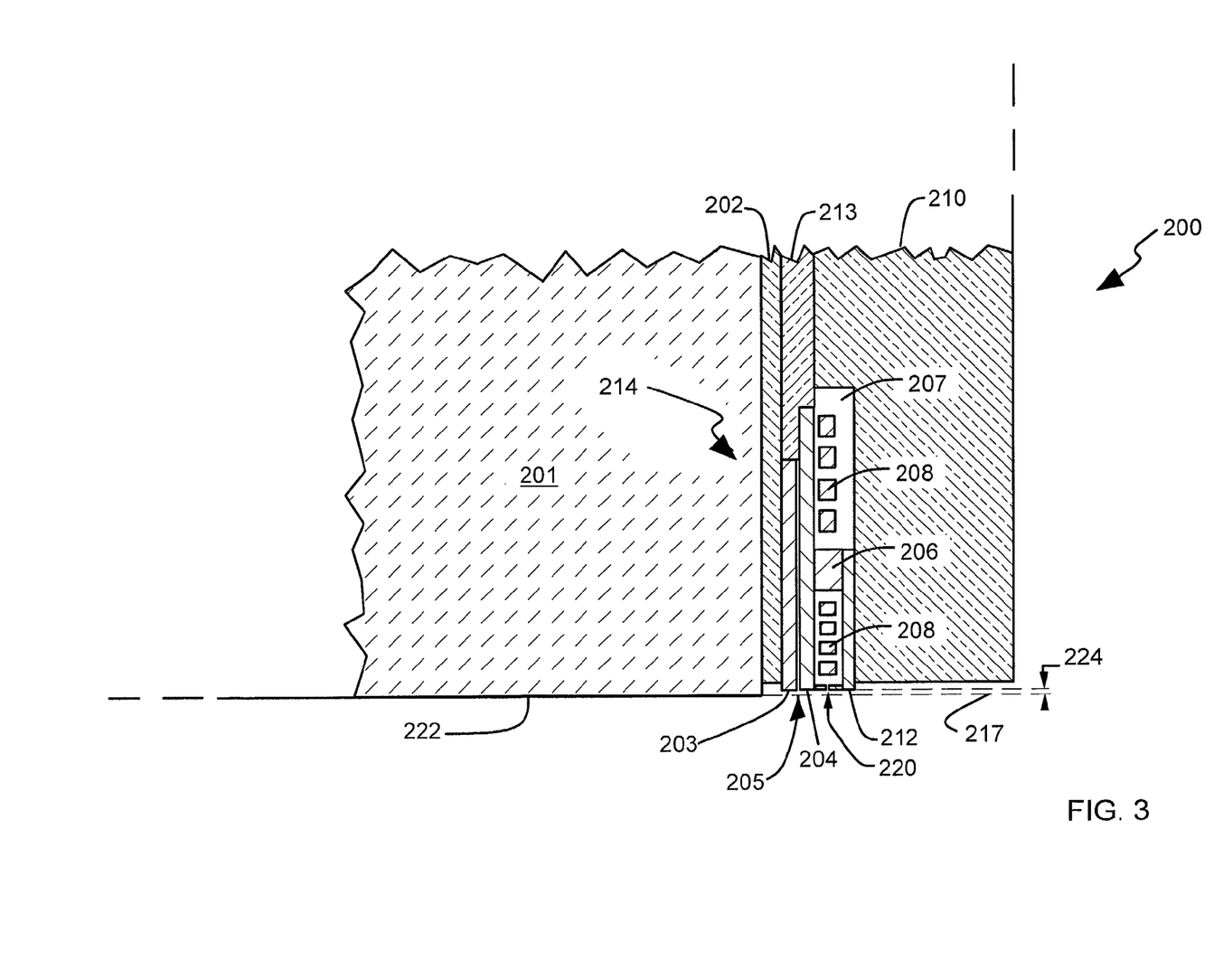
FIG. 3 schematically illustrates a cross-section of a head after lapping.

FIG. 3 schematically illustrates a cross-section of the head 200 illustrated in FIG. 2 after lapping has been performed on the head 200. During the process of lapping of the air bearing surface (ABS) 222, the substrate 201 and layers 202, 203, 204, 205, 210, 212 are eroded at different rates due to their different mechanical and chemical properties. FIG. 3 schematically illustrates the typical positions of the various layers relative to the air bearing surface (ABS) 222 after lapping. Typically, the layers 202 and 210, which can be $Al_2O_3$ or other materials, are eroded more than the substrate 201. Layers 202, 210 are thus recessed with respect to the lapped air bearing surface 222 of substrate 201. Metallic magnetic layers 203, 204, 212 forming the transducer 214 are also recessed with respect to the substrate 201 but their recession is typically smaller than that of the $Al_2O_3$ layers. The magnitude of the recession of magnetic poles and shields with respect to the substrate edge is critical for head performance and it is called "pole tip recession" (PTR) 224. The dashed line 217 shows where the edges of all the layers would be with zero recession. For clarity, the magnitude of pole tip recession 224 is exaggerated in FIG. 3 as compared to an actual head.

The head 200 illustrated in FIGS. 2–3 does not include a pole-to-disc spacing temperature compensation deposit, and the problem with thermal pole tip protrusion in a head like head 200 is illustrated in more detail below in connection with FIGS. 4–5.

Figure 4:
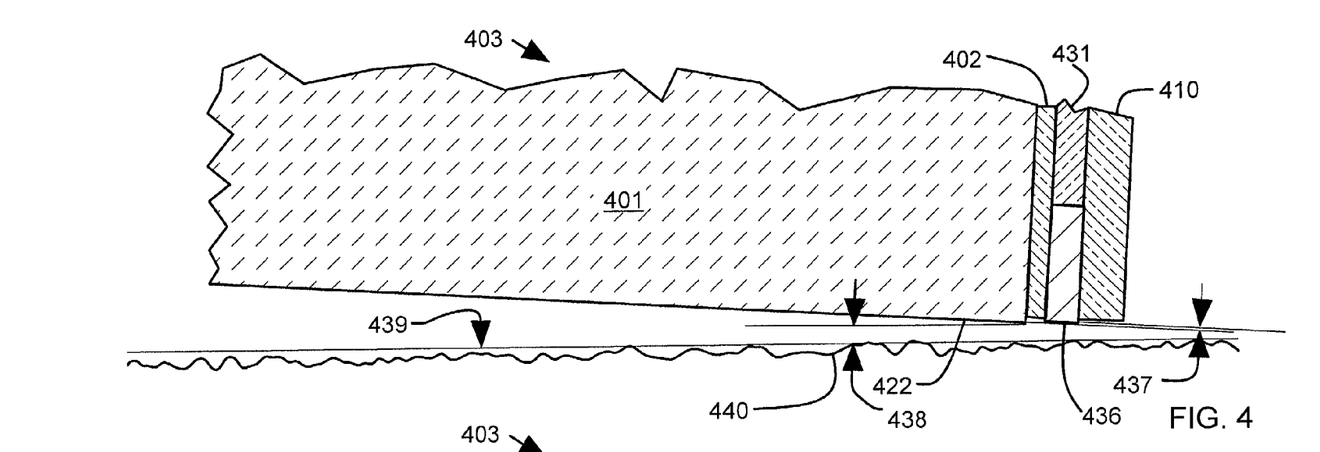
FIG. 4 schematically illustrates a cross-sectional side view of a head at room temperature flying over a disc surface.
Figure 5:
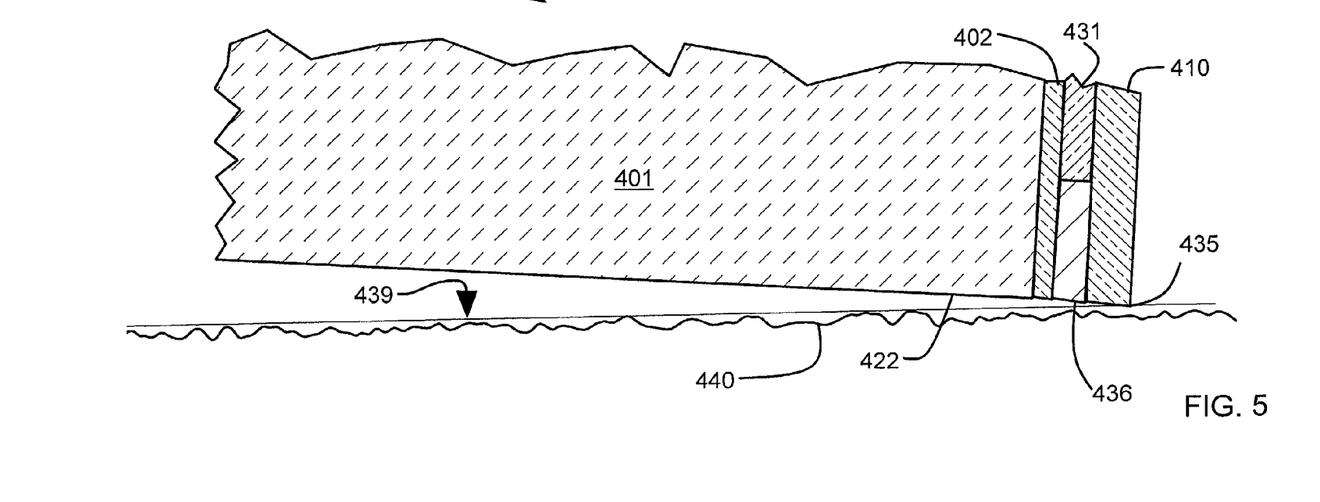
FIG. 5 schematically illustrates a cross-sectional side view of a head at elevated temperatures with pole tip protrusion flying over a disc surface.

FIGS. 4–5 schematically illustrate a cross-section of a head 403 flying over a disc surface 440 at room temperature (FIG. 4) and at an elevated temperature (FIG. 5). During disk drive operation, electrical power is dissipated in the disc drive, particularly in the transducer 436, and the temperature of the head 403 increases. The temperature of the head 403 itself and/or of the transducer 436 can be significantly higher than the overall disc drive temperature due to the large amount of heat dissipated in the transducer 436 relative to the small size of the head 403.

The CTEs of a substrate 401 and of various deposited layers 402, 436, 410, 431 are typically different from one another. Typically, the magnetic metallic layers in transducer 436 have larger CTEs, and insulating layers 402, 431, 410 have lower CTEs. All these layers are grown on substrate 401 that has much larger volume compared to the volume of the layers 431, 410, 402 and the transducer 436. Due to the different CTEs of materials in various head layers, the shape of the head 403 distorts at elevated temperature. The pole tip recession (PTR) 437 that is present at room temperature as illustrated in FIG. 4 is reduced or completely lost with elevated head temperature as illustrated at FIG. 5. The change of PTR with temperature is therefore referred to as thermal PTR (T-PTR).

The CTEs of the aluminum oxide layers 402, 431, 410 are close to that of substrate 401, so that the pole/shield protrusion at higher operating temperatures is due primarily to expansion of the metallic layers in transducer 436. This expansion is only weakly constrained by the adjacent substrate 401, basecoat layer 402, and overcoat layers 431, 410.

During drive operation, the head 403 flies above the spinning magnetic recording media surface 440. Over all operating temperatures of the drive, the pole-to-disc spacing 438 needs to be kept low enough as required for reading and writing the desired high areal bit density. The head 403 should not get in contact with magnetic media surface 440 as illustrated in FIG. 5. The pole-to-disc spacing 438 is primarily determined by the shape of the air-bearing surface 422 that is patterned into the slider substrate 401. The performance of the transducer 436 depends primarily on the distance between the recording media and the pole/shield tips of the head 436. There is thus a need to reduce pole-to-disc spacing to improve head performance, and a conflicting need to increase pole-to-disc spacing to avoid head crashes due to protrusion at high temperatures as illustrated in FIG. 5.

FIG. 4 shows schematically a transducer 436 at room operating temperature flying above a magnetic media surface 440 illustrated with exaggerated roughness. In FIG. 4, the transducer 436 does not contact the highest points 439 of the magnetic media surface 440. FIG. 5 shows schematically the same transducer 436 at high operating temperature. Most of the volume of the transducer 436 is formed by metallic layers and the coil insulator that have large CTEs. Due to the larger CTE of metallic layers in the transducer and possibly also of cured photoresist used as coil insulator, the pole/shield tips of transducer 436 protrude more with respect to the air bearing surface 422 at higher temperature (FIG. 5) than at room temperature (FIG. 4). This effect known as T-PTR places the transducer 436 closer to the magnetic media surface 440 at higher temperatures.

The magnetic transducer 436 has to fly low, close enough to the media, to have good electrical performance. At the same time, the head 403 has to stay flying under all conditions without mechanically touching the media. If the pole-to-disc spacing at lower ambient temperature (see FIG. 4) is not large enough, the protruded pole/shield tips at higher temperature (see FIG. 5) hit the media causing thermal asperities. This results in magnetic instabilities and contamination leading to tribological problems, and eventually a head crash. To avoid head-media contact 435 at higher drive temperature (FIG. 5), the pole-to-disc spacing 438 has to be large enough at lower temperature (FIG. 4), with undesirable effect on head electrical performance.

It is difficult to keep the pole-to-disc spacing low enough over the operating temperature range without having head-media contact. This problem is solved, as explained below in connection with FIGS. 6–17 by a head and transducer design in which one or more deposits along a trailing edge of a head include compensating air bearing surfaces that change position relative to the substrate air bearing surface. In FIGS. 6–13, 16, 17 described below, various temperature compensating deposits are marked with a stippled appearance for convenient identification.

Figure 6:
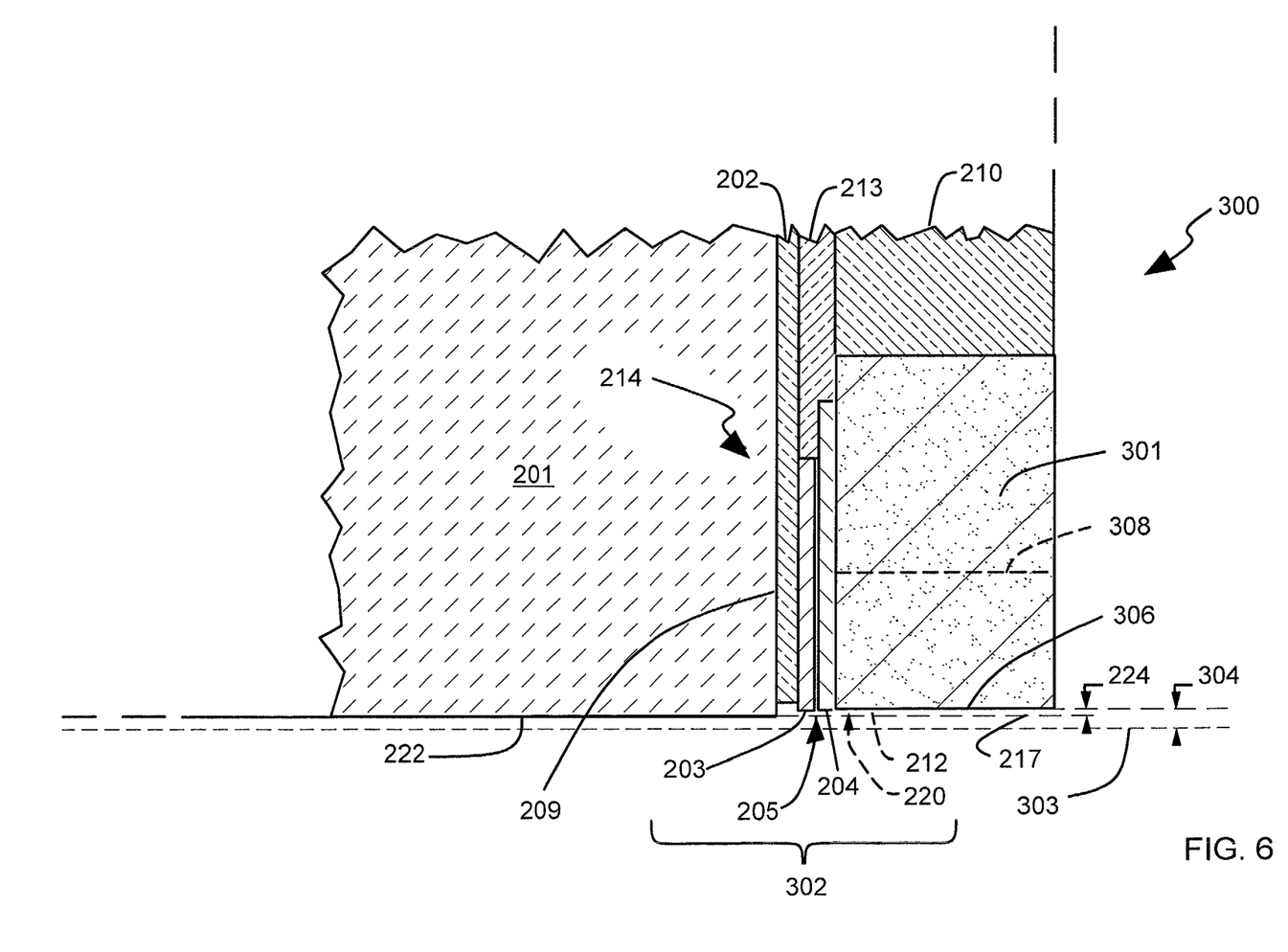
FIG. 6 schematically illustrates a cross-sectional side view of a first embodiment of a head that includes a deposit with a compensating air bearing surface.

FIG. 6 schematically illustrates a cross-sectional side view of a first embodiment of a head 300 for use in a disc drive such as disc drive 100 in FIG. 1. The head 300 is similar to head 200, however, head 300 also includes one or more deposits 301 along a trailing side 209 of a substrate 201. In FIG. 6, the read-write magnetic transducer 302 is along a centerline and partially hidden from view. The view in FIG. 6 is offset from the centerline.

The substrate 201 includes a substrate air bearing surface 222 that generates a first lift, or force tending to lift the head away from a disc surface 303. The magnetic transducer 302 (including features 203, 205, 204, 220, 212 as described in FIGS. 2–3) is deposited along the trailing side 209. The magnetic transducer has a pole tip 220 (hidden from view in FIG. 6) that is spaced apart from the disc surface 303 by a pole-to-disc spacing 304. The deposit (or deposits) 301 are positioned alongside a write head which includes a top pole 212, a core 206, a pole tip 220 and a write coil 208 as illustrated in FIGS. 2–3.

Each deposit 301 includes a compensating air bearing surface 306 that changes altitude relative to the substrate air bearing surface 222 as temperature increases. When the pole tip 220 increasingly protrudes as temperature increases, then the compensating air bearing surface 306 changes position relative to the substrate air bearing surface 222. The compensating air bearing surface 306 generates a temperature compensating lift that lifts the head 300 away from the disc surface 302 to compensate for the protrusion of the pole tip 220. The temperature compensating lift stabilizes the pole-to-disc spacing 304.

At least some of the deposits 301 have a coefficient of temperature expansion (CTE) that is greater than a coefficient of temperature expansion of the substrate 201. Depending on the compensation characteristic needed for a particular application, an additional deposit 301 can also be included that has a coefficient of temperature expansion that is less than a coefficient of temperature expansion of the substrate 201.

In some applications, the deposits 301 can be formed of a material, such as copper, that has a coefficient of temperature expansion that is greater than a coefficient of temperature expansion of the magnetic transducer 302. In other applications, deposits 301 can be formed of the same material as the pole tip.

The deposits 301 can be manufactured from one type of material or a combination of two or more materials. For example, a deposit 301 can be formed of a lower CTE material, such as a nickel iron alloy, up to step level 308 and a higher CTE material, such as copper, above the step level 308.

In a preferred arrangement, the first compensating air bearing surface 306 is coated with a diamond-like coating (DLC). The diamond-like coating provides improved friction characteristics and increased durability.

Figure 7:
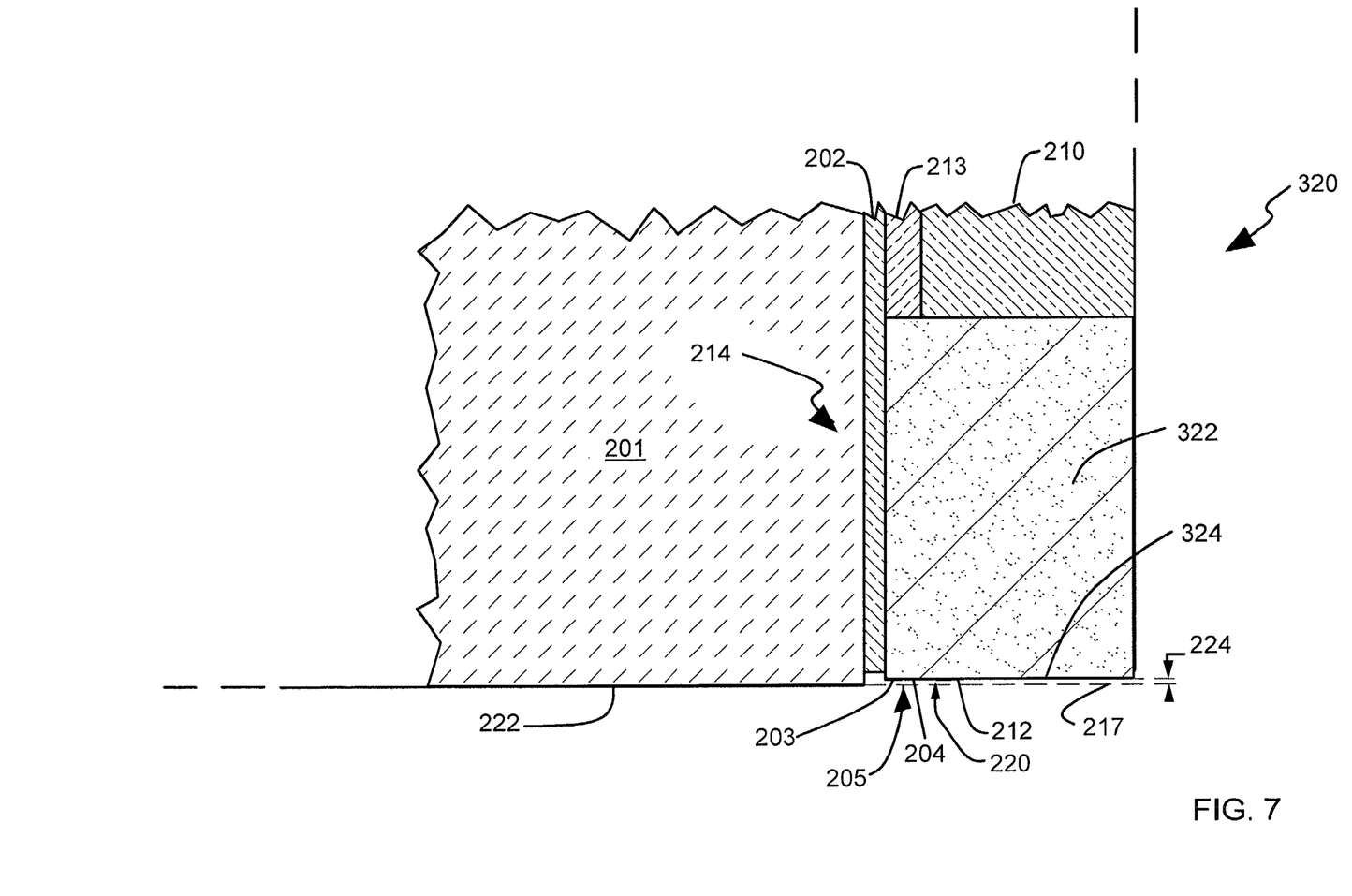
FIG. 7 schematically illustrates a cross-sectional side view of a second embodiment of a head that includes a deposit with a compensating air bearing surface.
Figure 8:
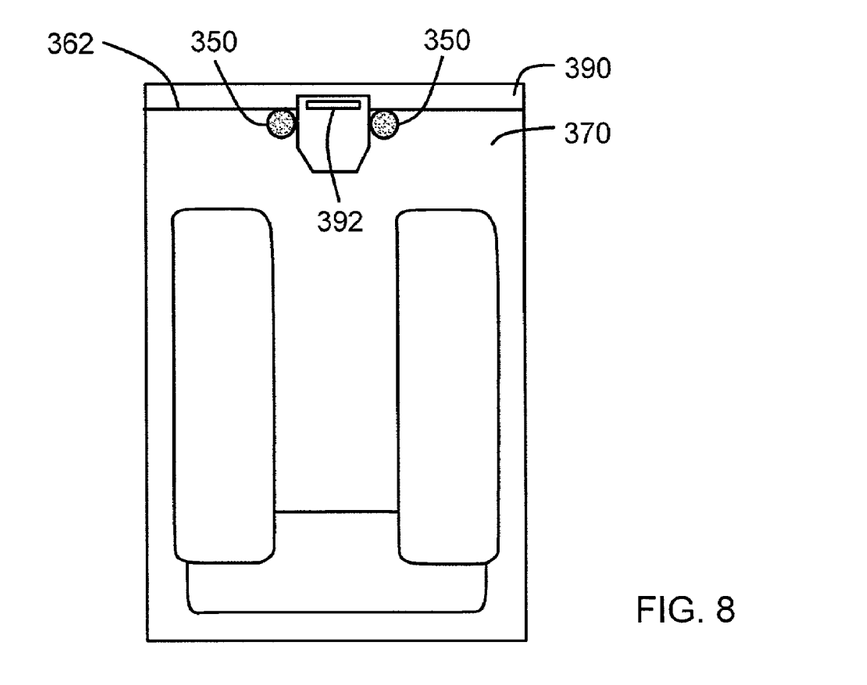
FIG. 8 schematically illustrates a bottom view of a third embodiment of a head that includes a deposit with a compensating air bearing surface.
Figure 9:
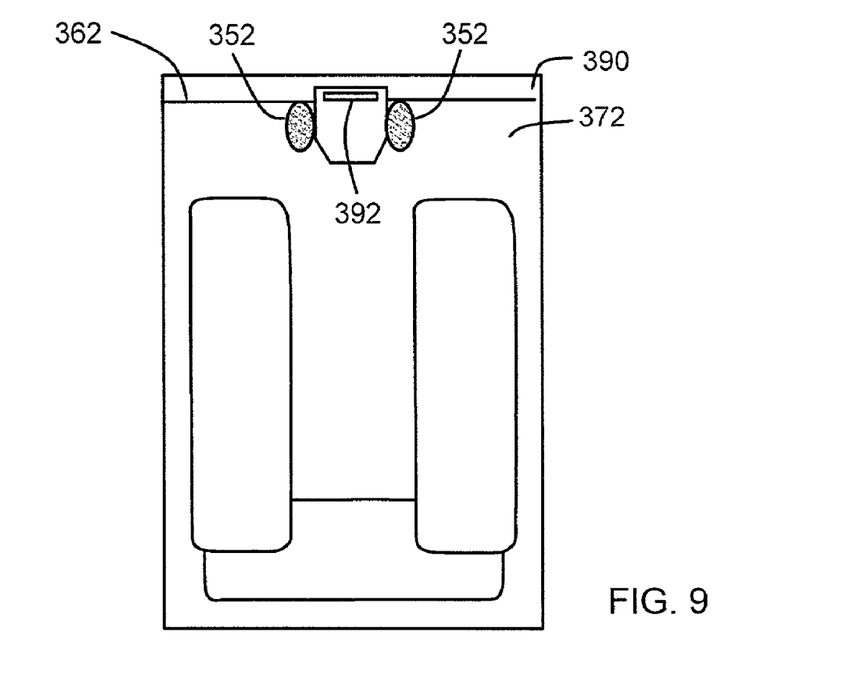
FIG. 9 schematically illustrates a bottom view of a fourth embodiment of a head that includes a deposit with a compensating air bearing surface.
Figure 10:
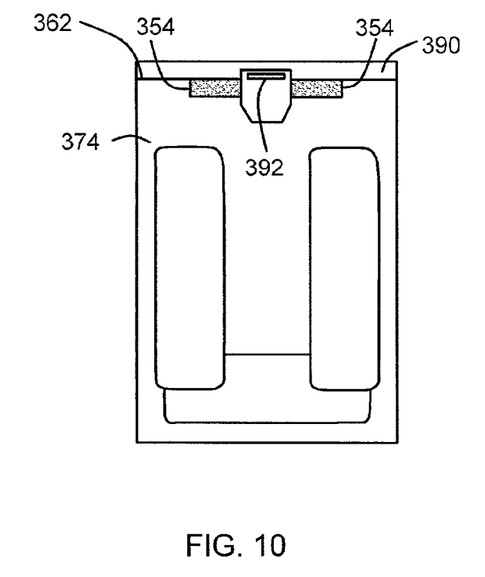
FIG. 10 schematically illustrates a bottom view of a fifth embodiment of a head that includes a deposit with a compensating air bearing surface.
Figure 11:
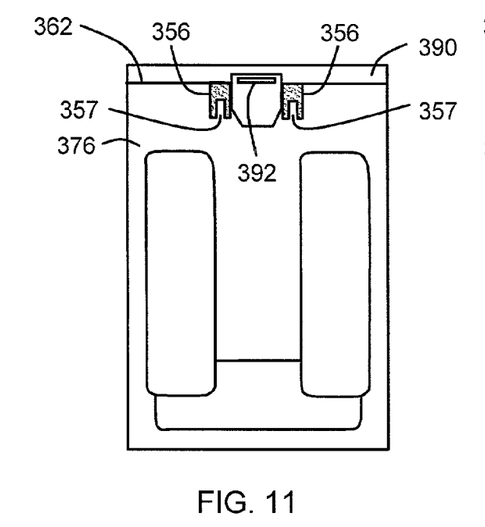
FIG. 11 schematically illustrates a bottom view of a sixth embodiment of a head that includes a deposit with a compensating air bearing surface.
Figure 12:
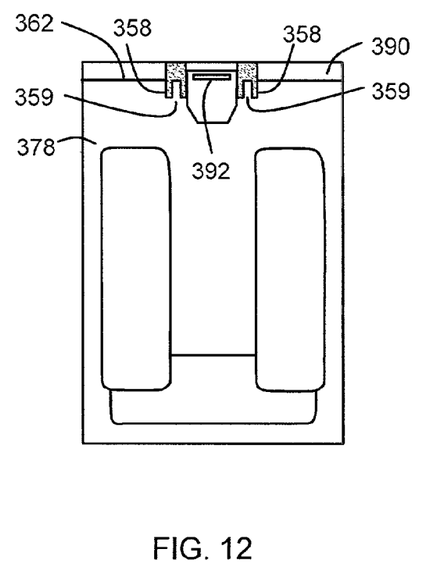
FIG. 12 schematically illustrates a bottom view of a seventh embodiment of a head that includes a deposit with a compensating air bearing surface.
Figure 13:
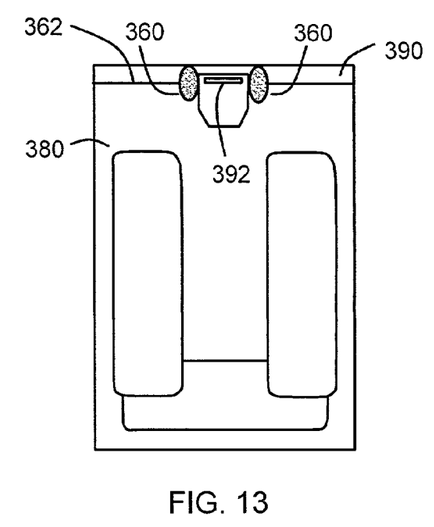
FIG. 13 schematically illustrates a bottom view of an eighth embodiment of a head that includes a deposit with a compensating air bearing surface.

FIG. 7 schematically illustrates a cross-sectional side view of a second embodiment of a head 320 that includes a deposit 322 along a trailing side of the substrate 201. The head 320 is similar to the head 300, however, the deposit 301 on head 320 is deposited alongside the write head, while the deposit 322 is deposited alongside both the read head and the write head. The deposit 322 is deposited on the basecoat 202 as illustrated in FIG. 7. In other respects, the heads 300 and 320 are substantially similar. In FIG. 7, the head 320 is placed closer to the substrate 201. In comparison with FIG. 6, a compensating air bearing surface 324 on deposit 322 in FIG. 6 is in closer proximity to the substrate air bearing surface 222. This closer proximity enhances the aerodynamic interaction between the compensating air bearing surface 324 and the substrate air bearing surface 222.

FIGS. 8–13 schematically illustrate bottom views (substrate air bearing surfaces) of various substrates that include deposits 350, 352, 354, 356, 358, 360 along the trailing sides 362 of substrates 370, 372, 374, 376, 378, 380. The deposits are shaped as pads and include compensating air bearing surfaces (identified by a stippled appearance) that change position relative to the substrate air bearing surfaces as temperature increases. The pads can have a simple geometry as shown in FIGS. 8, 9, 10, 13 (posts of circular (FIG. 8), rectangular (FIG. 10, ellipsoidal (FIG. 9) cross section, etc.), or can have trenches 357, 359 (FIGS. 11, 12) to enhance pressurization. The pads may be placed in cavities in the substrates 370, 372, 374, 376 (FIGS. 8, 9, 10, 11), in cavities that are partially in the substrates and partially in deposited layers 390 (FIGS. 12, 13), or in cavities that are completely in the deposited layers 390. The deposits are preferably deposited in closed proximity to the magnetic transducer 392 as illustrated in FIGS. 8–13.

In one preferred arrangement, the deposits 350, 352, 354, 356, 358, 360 go all the way through the slider thickness in a direction perpendicular to the views shown in FIGS. 8–13. This arrangement provides a large heat sink to better control thermal expansion by removal of the heat from transducer region.

Figure 14:
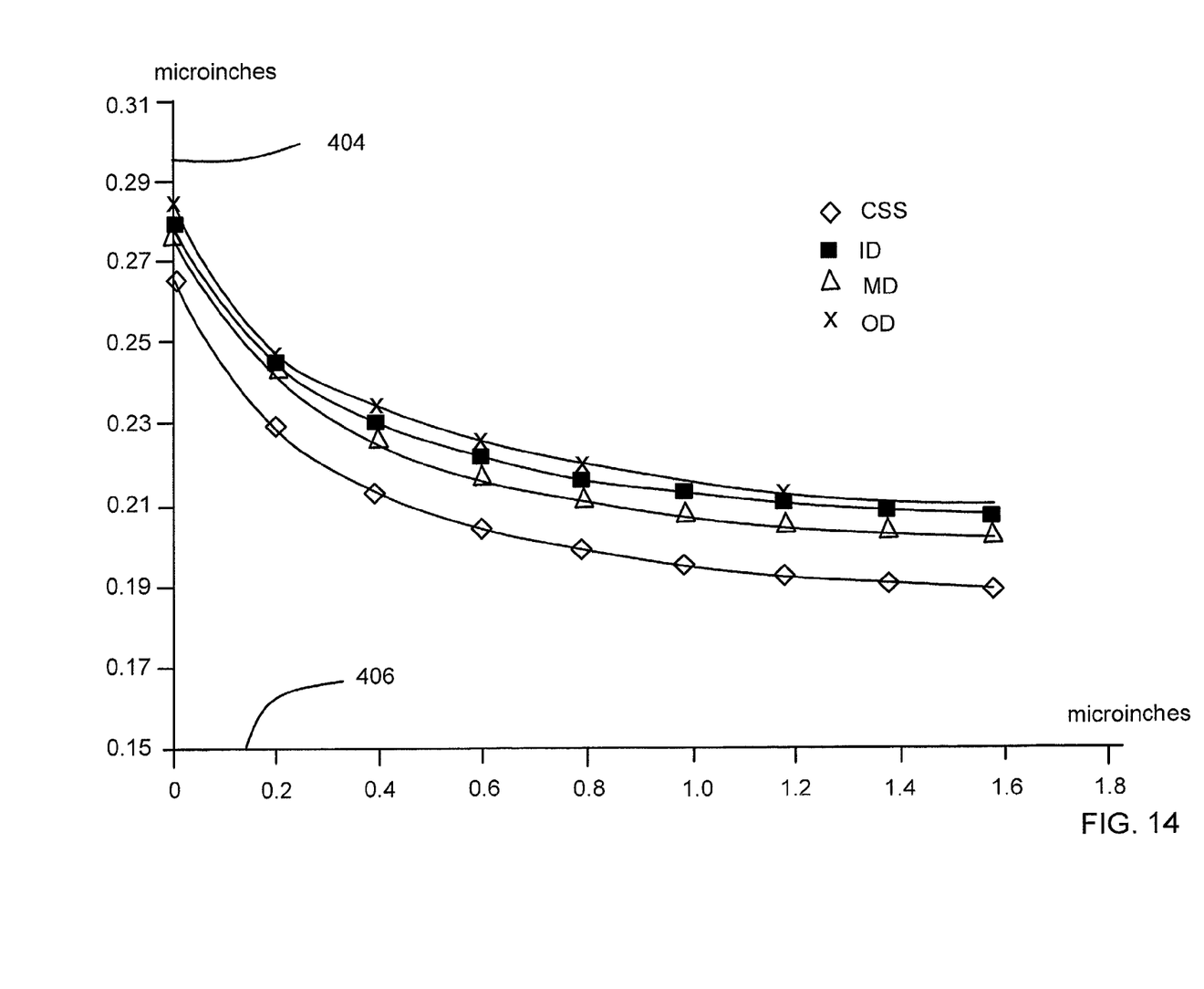
FIG. 14 illustrates a graph of pole-to-disc spacing as a function of recession of a compensating air bearing surface along a trailing edge of a head.

FIG. 14 illustrates a graph of substrate air bearing surface-to-disc spacing as a function of recession of an alumina deposit along a trailing edge of the substrate. In FIG. 14, a vertical axis 404 represents surface-to-disc spacing in microinches, and a horizontal axis 406 represents recession of the alumina feature relative to an adjacent substrate air bearing surface in microinches. Four different head configurations (labeled CSS, ID, MD and OD) are illustrated in FIG. 14. As can be seen from FIG. 14, the alumina deposit increases the lift of the adjacent substrate air bear surface that is already a high pressure region. The substrate air bear surface-to-disc spacing changes with temperature due to the movement of a compensating air bearing surface on the alumina deposit.

Figure 15:
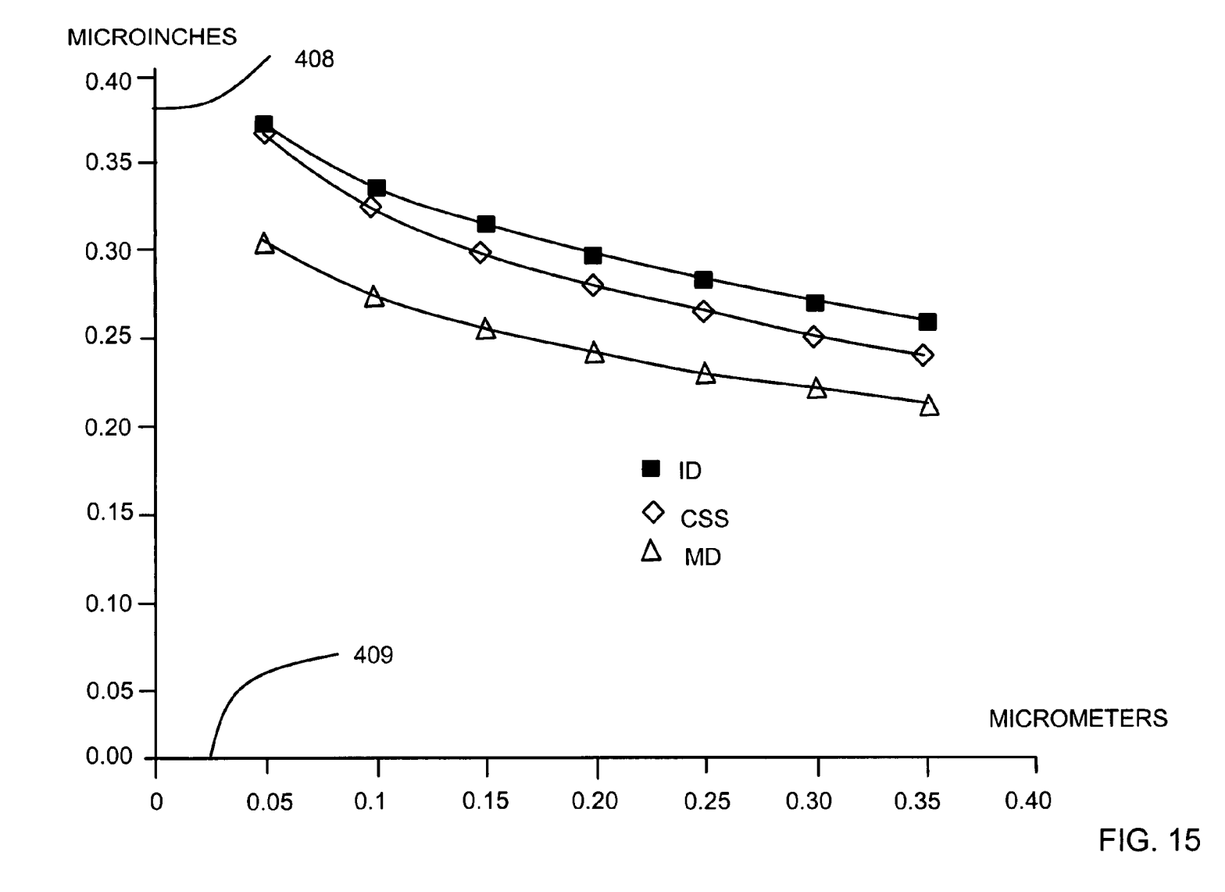
FIG. 15 illustrates a graph of pole-to-disc spacing as a function of protrusion of a compensating air bearing surface along a trailing edge of a head.

FIG. 15 illustrates a graph of substrate air bearing surface-to-disc spacing as a function of protrusion of a metallic deposit along a trailing edge of the substrate. In FIG. 14, a vertical axis 408 represents surface-to-disc spacing in microinches, and a horizontal axis 409 represents protrusion of the metallic feature relative to an adjacent substrate air bearing surface in micrometers. Three different head configurations (labeled CSS, ID and MD) are illustrated in FIG. 15. As can be seen from FIG. 15, the metallic deposit decreases the suction of the adjacent substrate air bear surface that is already a low pressure region. The substrate air bear surface-to-disc spacing changes with temperature due to the movement of a compensating air bearing surface on the metallic deposit.

Adding a feature on the trailing edge of an air bearing surface that has variable height can impact the pole-to-disc spacing in two primary ways: an increase of the lift of an already high pressure region, or a decrease of the suction of a low pressure region. Increasing the lift of an already high pressure region may provide greater sensitivity of pole-to-disc spacing to the feature with the variable height but would also be a concern that it may become the close point on the air bearing surface. The second method, decreasing the suction force of a low pressure zone, allows the feature height to change and affect pole-to-disc spacing without concern of it becoming the close point, though pole-to-disc spacing is generally less sensitive to such feature. FIG. 14 shows the sensitivity curve to alumina recession which would be similar to the first mode of pole-to-disc spacing adjust, increasing the pressure of an already high pressure region. FIG. 15 shows the sensitivity curve to a large metallic feature at the trailing edge of the cavity region on the air bearing. This feature changes pole-to-disc spacing by the second mode, increasing pressure of a negative pressure region.

Figure 16:
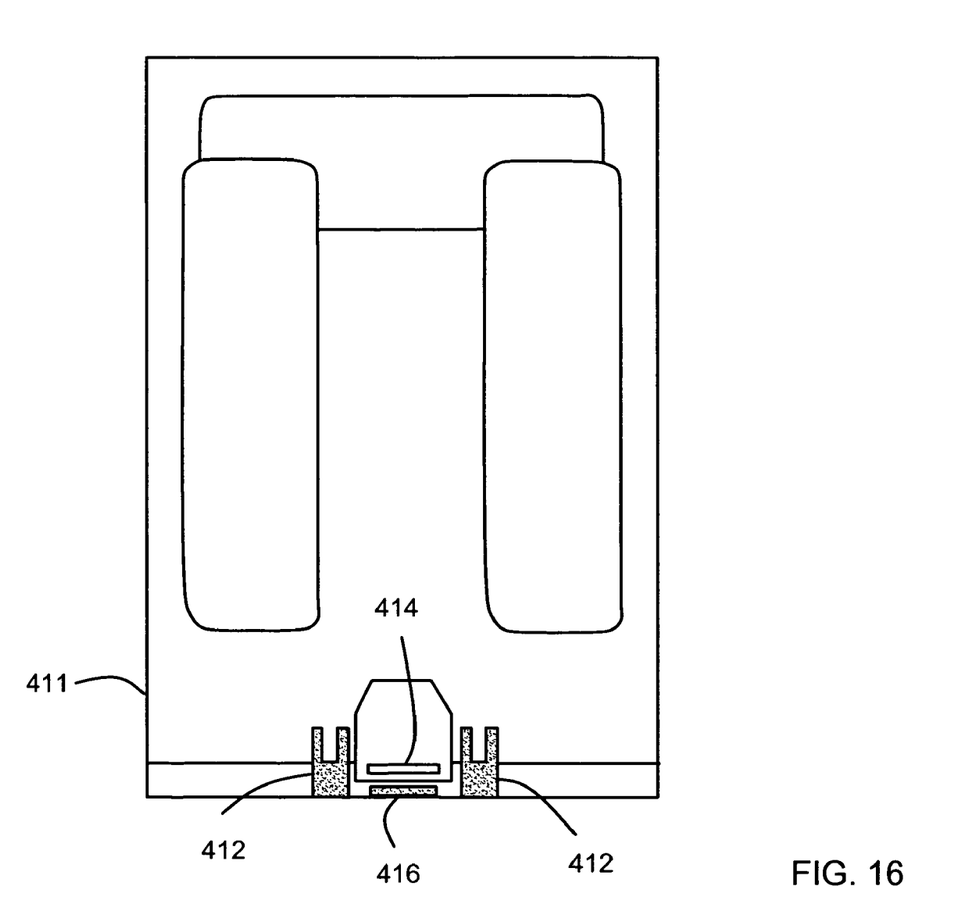
FIGS. 16–17 illustrate bottom and trailing side views of a head with deposits of different heights arranged alongside and over a read/write magnetic transducer.
Figure 17:
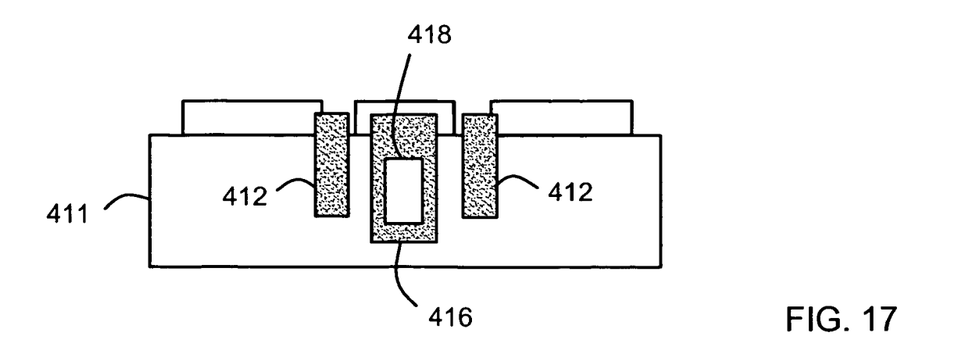

FIGS. 16–17 illustrate a bottom view of a head 411 with deposits 412 arranged alongside a read/write transducer 414 and a deposit 416 arranged on the read/write transducer 414. Adjustment of the compensation can be provided by providing different heights of the deposits 412, 416, as well as by use of different materials for the deposits 412, 414.

An optional electrical heating element 418 can be deposited on the deposit 416 to provide heating. The heating deposit can actively control the thermal response of the deposit for a desired pole-to-disc spacing.

Deposits can be made from a material with large thermal expansion in the transducer part of the slider (including overcoat) and can be positioned such that they will interact with the substrate air bearing surface in the area where no cavity is milled. In such a way they will be the part of the overall air bearing surface that is the closest to the disc surface and that is also the highest pressure region between the slider and media. The high thermal expansion material can be made from copper as part of copper stud build process or as an independent process step, it can be made from a magnetic metallic alloy used for shields or poles, or it can be another material specifically selected for fly control.

Deposits on the overcoat region can be placed alongside of the center pad or at the back of transducer. There is additional advantage by having more flexibility in controlling the depth of the features. The trailing side view FIG. 17 illustrates deposits of different heights, placed at various locations.

In summary, a head (300) for a disc drive (100) comprises a substrate (201). The substrate (201) includes trailing side (209) and a substrate air bearing surface (222) that is shaped to fly over a disc surface (303) and that generates a first lift. The head (300) also comprises a magnetic transducer (302)

that is deposited along the trailing side (209). The magnetic transducer (302) has a pole tip (220) that is spaced apart from a disc surface (303) by a pole-to-disc spacing (304). The head (300) also comprises a first deposit (301) deposited along the trailing side (209).

The first deposit (301) includes a first compensating air bearing surface (306) that changes position relative to the substrate air bearing surface (222) as temperature increases.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular deposits may vary depending on the particular application for the head while maintaining substantially the same functionality without departing from the spirit and scope of the invention. The substrate, and in particular the air bearing surface on the substrate can take any of various known shapes adapted for use with a pole-to-disc spacing temperature compensation deposit. In addition, although the preferred embodiments described herein are described in connection with a hard disc drive, it will be appreciated by those skilled in the art that the teachings of the present invention can be applied to other magnetic drives such as removable discs known as Zip and Jazz drives, tape drives and magneto-optic drives without departing from the scope and spirit of the present invention.

What is claimed is:

1. A head, comprising:
   a substrate including a substrate surface and a substrate trailing side;
   an overcoat layer positioned along the substrate trailing side;
   a transducer positioned between the substrate and the overcoat layer and having a trailing edge; and
   a first deposit positioned along the substrate trailing side at least partially past the trailing edge, the first deposit including a first temperature compensating bearing surface that changes position relative to the substrate surface as temperature increases, and at least a portion of the first deposit has a coefficient of temperature expansion that is greater than a coefficient of temperature expansion of the transducer.

2. The head of claim 1 wherein a tip of the transducer increasingly protrudes as temperature increases, and the first compensating bearing surface generates a temperature compensating lift that compensates for the protrusion.

3. The head of claim 2 wherein the temperature compensating lift stabilizes a tip-to-storage surface spacing.

4. The head of claim 1 wherein at least a portion of the first deposit has a coefficient of temperature expansion that is greater than a coefficient of temperature expansion of the substrate.

5. The head of claim 4 further comprising a second deposit that is positioned along the trailing side and has a coefficient of temperature, expansion that is more than a coefficient of temperature expansion of the substrate.

6. The head of claim 1 further comprising a second deposit that is positioned along the trailing side and has a coefficient of temperature expansion that is less than a coefficient of temperature expansion of the substrate.

7. The head of claim 6 wherein the second deposit has a height along the trailing side that differs from a height along the trailing side of the first deposit.

8. The head of claim 1 wherein at least a portion of the first deposit has a coefficient of temperature expansion that is greater than $12.2 \times 10^{-6}$/degree Centigrade.

9. The head of claim 1 wherein at least a portion of the first deposit is formed of the same material as a pole tip of the transducer.

10. The head of claim 1 wherein at least a portion of the first deposit comprises copper.

11. The head of claim 1 wherein the first compensating bearing surface is coated with a diamond-like coating.

12. The head of claim 1 wherein the first deposit is partially embedded in a cavity formed in the substrate and partially protrudes past the trailing side of the substrate.

13. The head of claim 1 wherein the substrate has a top substrate surface opposite the substrate surface, and the first deposit extends up to the top substrate surface.

14. The head of claim 1 wherein the first deposit is positioned on the trailing side of the substrate.

15. The head of claim 10 wherein the first deposit is embedded in a cavity formed in the substrate.

16. The head of claim 10 wherein the first deposit is deposited on the transducer.

17. The head of claim 1, further comprising:
   an electric heating element that is deposited on the first deposit.

18. The head of claim 1, wherein the first deposit is shaped to form a trench in the substrate.

19. A head, comprising:
   a substrate including a substrate trailing side, and a substrate surface that forms a part of a bearing surface;
   an overcoat layer positioned along the substrate trailing side;
   a transducer positioned between the substrate and the overcoat layer and having a trailing edge; and
   a first deposit positioned along the substrate trailing side and extending past a portion of the transducer toward the trailing edge, the first deposit including a temperature compensating deposit surface that changes position relative to the substrate surface as temperature increases and at least a portion of the first deposit has a coefficient of temperature expansion that is greater than a coefficient of temperature expansion of the transducer, and further wherein the temperature compensating deposit surface forms a part of the bearing surface.

20. The head of claim 19 wherein the first deposit is metallic.

21. The head of claim 20 wherein the metallic deposit increases lift in a high pressure region of the bearing surface.

22. The head of claim 20 where the metallic deposit decreases suction in a low pressure region of the bearing surface.

23. The head of claim 20 wherein the metallic deposit comprises copper.

24. The head of claim 19 wherein a tip of the transducer increasingly protrudes as temperature increases and the deposit surface generates a temperature compensating lift.

25. The head of claim 19 wherein the deposit surface generates a temperature compensating lift that stabilizes a tip-to-storage surface spacing.

26. The head of claim 19 wherein the first deposit that has a coefficient of temperature expansion that is greater than a coefficient of temperature expansion of the substrate.

27. The head of claim 26 and further comprising a second deposit that is deposited along the trailing side and has a coefficient of temperature expansion that is more than a coefficient of temperature expansion of the substrate.

28. The head of claim 26 wherein at least a portion of the first deposit is formed of the same material as a pole tip of the transducer.

29. The head of claim 26 wherein at least a portion of the first deposit comprises copper.

30. The head of claim 26 wherein the compensating deposit surface includes a diamond-like coating.

* * * * *